United States Patent [19]
Scherson

[11] Patent Number: 5,096,054
[45] Date of Patent: Mar. 17, 1992

[54] ELECTROCHEMICAL METHOD FOR THE REMOVAL OF NITROGEN OXIDES AND SULFUR OXIDES FROM FLUE GAS AND OTHER SOURCES

[75] Inventor: Daniel A. Scherson, Cleveland Heights, Ohio

[73] Assignee: Case Western Reserve University, Cleveland, Ohio

[21] Appl. No.: 535,752

[22] Filed: Jun. 11, 1990

[51] Int. Cl.⁵ .......... C25B 1/22; C01B 17/56; C01B 21/20
[52] U.S. Cl. .................. 204/101; 204/103; 204/104; 204/130; 204/DIG. 4; 423/235; 423/242
[58] Field of Search ........... 204/101, 103, 104, 130, 204/DIG. 4; 423/235, 242

[56] References Cited
U.S. PATENT DOCUMENTS

| | | | |
|---|---|---|---|
| Re. 31,718 | 10/1984 | Winnick et al. | 204/61 |
| Re. 31,778 | 12/1984 | Winnick et al. | 204/130 |
| Re. 31,914 | 6/1985 | Oswin et al. | 204/412 |
| 3,281,274 | 10/1966 | Moerikofer | 136/86 |
| 3,523,880 | 8/1970 | Parsi | 204/104 |
| 3,622,487 | 11/1971 | Chand | 204/19 S |
| 3,763,025 | 10/1973 | Chand | 204/1 T |
| 4,001,103 | 1/1977 | Blurton et al. | 204/1 T |
| 4,025,412 | 5/1977 | LaConti | 204/195 R |
| 4,042,464 | 8/1977 | Blurton et al. | 204/1 T |
| 4,052,268 | 10/1977 | Blurton et al. | 204/1 T |
| 4,059,496 | 11/1977 | Schulten et al. | 204/104 |
| 4,076,899 | 2/1978 | Kring | 429/42 |
| 4,127,462 | 11/1978 | Blurton et al. | 204/1 T |
| 4,400,242 | 8/1983 | Albery et al. | 204/415 |
| 4,657,738 | 4/1987 | Kanter et al. | 422/186.04 |
| 4,670,234 | 6/1987 | Holter et al. | 423/235 |
| 4,770,760 | 9/1988 | Noda et al. | 204/425 |
| 5,022,975 | 6/1991 | Gordon | 204/130 |

Primary Examiner—John Niebling
Assistant Examiner—David G. Ryser
Attorney, Agent, or Firm—Fay, Sharpe, Beall, Fagan, Minnich & McKee

[57] ABSTRACT

A method for removing NOX from gases is provided. A gas comprising NOX and/or $SO_2$ is flowed behind a gas permeable anode. Air is simultaneously flowed behind the gas permeable cathode, and the cathode is separated from the anode by a liquid electrolyte. An external potential is applied between the anode and the cathode to bring about the oxidation of NOX and/or $SO_2$ at the anode and the reduction of dioxygen at the cathode to yield nitric oxide and/or sulfuric acid, and hydrogen peroxide.

22 Claims, 3 Drawing Sheets

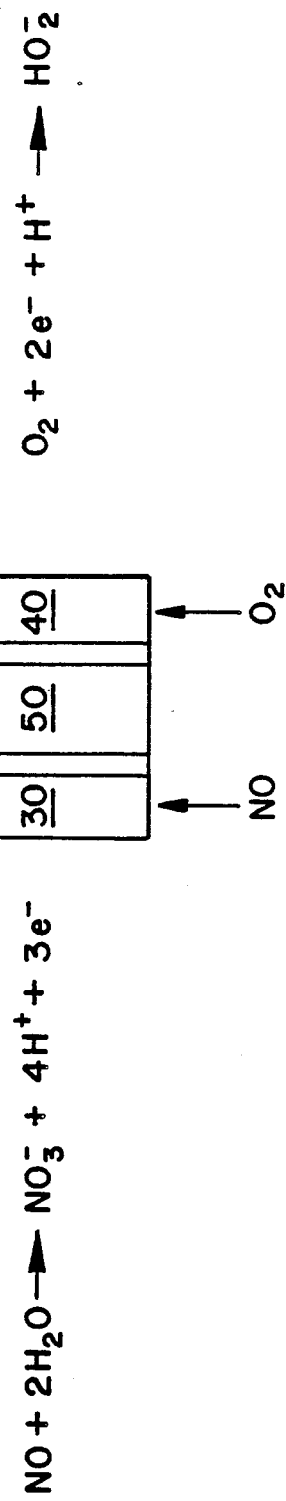
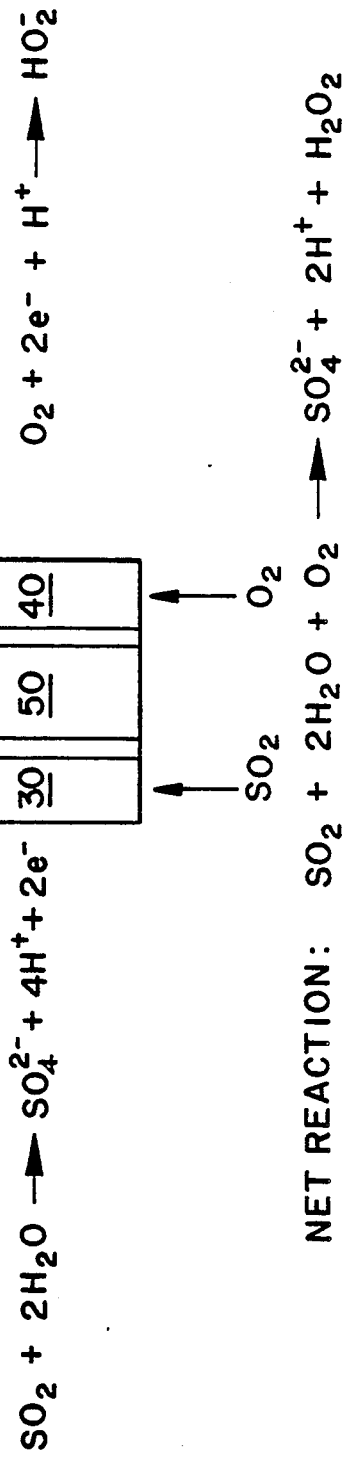

ELECTROCHEMICAL METHOD FOR THE REMOVAL OF NITROGEN OXIDES AND SULFUR OXIDES FROM FLUE GAS AND OTHER SOURCES

BACKGROUND OF THE INVENTION

This invention pertains to the art of the removal of nitrogen oxides (NOX) and sulfur oxides from fluid stream emissions such as those which originate from fossil fuel powered plants, flue gas, gas turbines and the like, and more particularly to the electrochemical removal of these oxides from such streams. This invention is particularly applicable to the removal of NOX and $SO_2$ using a fuel cell type device, and will be described with particular reference thereto. It will be appreciated, however, that the invention has broader applications such as its ability to generate nitric acid, sulfuric acid, and hydrogen peroxide, and may be advantageously employed in other environments and applications.

There exists a pressing need for the development of new technologies to eliminate NOX, $SO_2$, and other common pollutants from the atmosphere to help prevent further damage to the environment and to diminish the greater incidence of respiratory and other diseases in humans. Previous efforts in eliminating these pollutants have been made, and many of these efforts focused on the development of technologies capable of removing such pollutants by chemical means, such as conventional flue gas desulfurization, and/or electrochemical means using either porous or non-porous solid electrolytes.

In the case of NOX and $SO_2$ removal, most electrochemical processes developed to date call for high temperature electrochemical reduction of the gas to accomplish this goal. Although some of the prior methodologies have met with some success, the development of advanced technologies for the removal of polluting gases capable of meeting technical, economic and reliability requirements may be regarded as of utmost importance. This has become of particular interest in view of the stringent standards imposed by the regulatory agencies regarding the release of gaseous and other pollutants into the environment.

While some of the electrochemical methods so far proposed may approach the desired standards with respect to the percentage of NOX and $SO_2$ that is actually removed, the overall feasibility of the proposed processes in terms of long term performance and other considerations, such as the effects induced by the presence of impurities such as dioxygen in the effluent gas, still remains to be demonstrated.

The present invention contemplates a new and improved method for the simultaneous removal of nitrogen oxides (NOX) and sulfur oxides in a simple process configuration at room temperature. The process is not adversely affected by contaminants such as dioxygen present in the effluent gas at concentrations as high as 4%. It generates useful byproducts, and has a potential to significantly reduce emission control costs.

BRIEF DESCRIPTION OF THE INVENTION

In accordance with the present invention, there is provided a method for removing NOX, particularly nitrous and nitric oxide, as well as sulfur oxides from effluent gases.

In accordance with a more limited aspect of the invention, an exhaust gas that includes NOX is flowed behind a gas permeable anode. Simultaneously, air is flowed behind a gas permeable cathode. The cathode is separated from the anode by an aqueous electrolyte. An external potential is applied to the anode to bring about the oxidation of NOX (and $SO_2$) at that electrode and the reduction of dioxygen at the cathode to yield nitric acid, sulfuric acid, and hydrogen peroxide.

A principal advantage of the subject invention is that NOX or sulfur oxide is efficiently removed from effluent gas streams by using a somewhat conventional fuel cell-type device comprised of readily available materials.

Another advantage of the present invention is the fact that the method can be accomplished at room temperature, thus saving energy and costs involved with heating the gas.

Another advantage of the present invention is that the deterioration of the catalytic properties of the electrode is expected to be minimal.

Yet another advantage of the present invention is the useful generation of nitric acid, sulfuric acid, as well as hydrogen peroxide.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

FIGS. 1a and 1b are schematic drawings of an electrochemical cell embodying the principles of the present invention. They include an identification of peripheral testing equipment.

DETAILED DESCRIPTION OF THE PREFERRED EMBODIMENT

Figure 2:
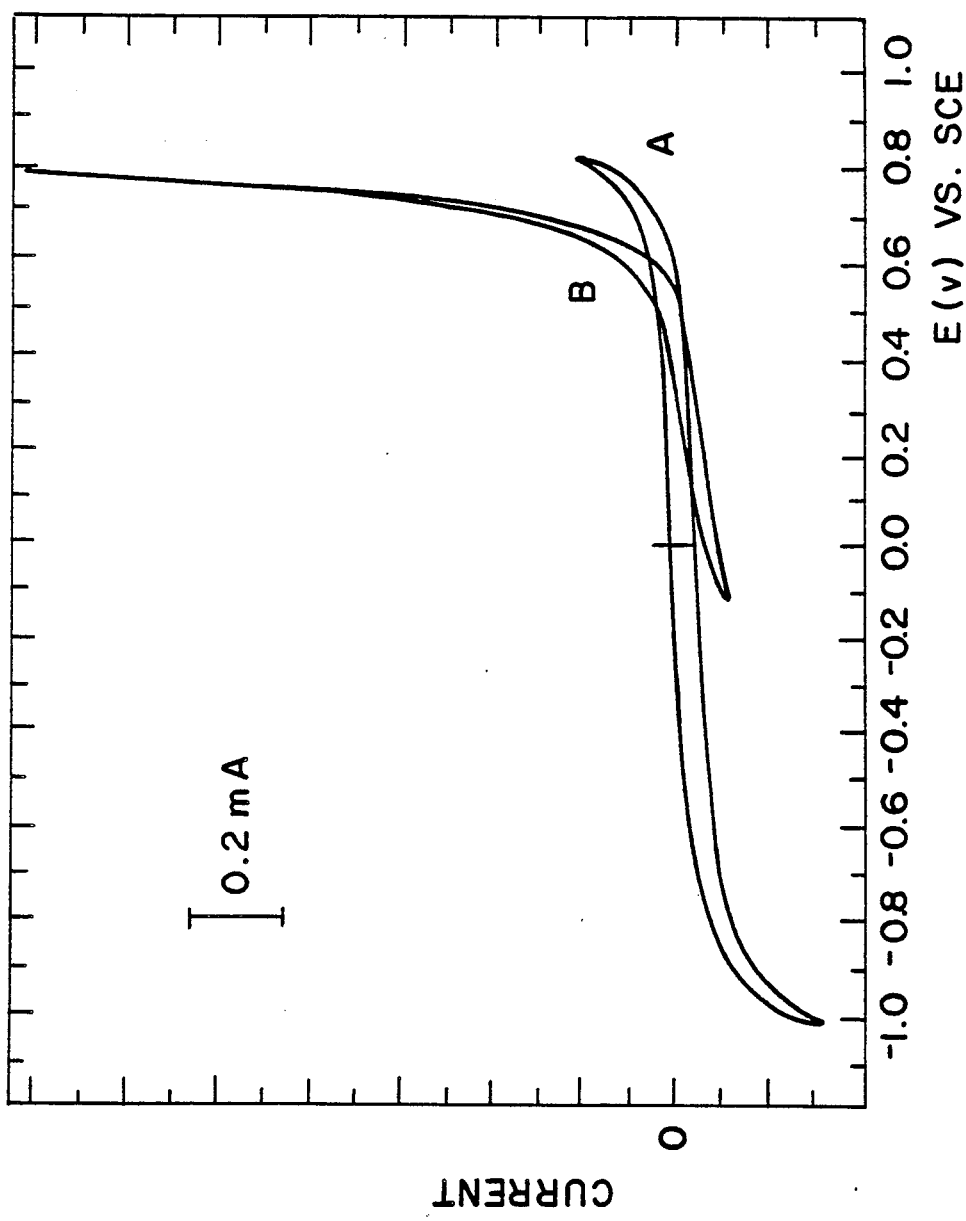
FIG. 2 is a graph showing the polarization curves for NO oxidation in a 0.1M $NaClO_4$ + 1mM $HClO_4$ solution.

A method is herein described for the removal of nitrogen oxides (NOX), particularly nitrous and nitric oxides, from flue gas and other sources. The method can be used in connection with removing sulfur oxides, mainly $SO_2$, from gases as well. Unlike other methodologies which rely on the reduction of NOX at elevated temperatures, the present approach is based on the electrochemical oxidation of NO and $NO_2$ in aqueous environments at room temperature for the elimination of these pollutants.

This method may be beneficial from an economic viewpoint, as the temperature of the effluent gases, of gas turbines for instance, may reach over 1000° C. As a result, the heat may be recovered for other uses by means of an appropriate heat exchanger. Moreover, while methods involving electrochemical reduction of NOX require heating the NOX to elevated temperatures, the current method is conducted at room temperatures.

The actual reaction is carried out in a fuel cell type device in which NOX and/or $SO_2$ (mixed with an inert gas or air) is flowed behind a gas permeable anode. Air is flowed behind a gas permeable cathode. An external potential is applied to the anode to bring about the oxidation of the NOX at that electrode and the reduction of dioxygen ($O_2$) at the cathode to yield nitric acid ($HNO_3$) and/or sulfuric acid ($H_2SO_4$) and, depending on the catalyst used in the cathode, hydrogen peroxide ($H_2O_2$) and/or water as the products. The reactions are as follows:

Anode:

$$NO + 2H_2O \longrightarrow NO_3^- + 4H^+ + 3e^- \quad E^* = +0.957$$

$$\text{and/or } SO_2 + 2H_2O \longrightarrow SO_4^{2-} + 4H^+ + 2e^-$$

$$\text{Cathode: } O_2 + 2H^+ = 2e^- \longrightarrow H_2O_2 \quad E^* = +0.695$$

Net Reaction:

$$2NO + 3O_2 + 4H_2O \longrightarrow$$

$$NO_3^- + 2H^+ + 3H_2O_2 \quad E = -0.262 \text{ V vs. SHE}$$

$$\text{and/or } SO_2 + O_2 + 2H_2O \longrightarrow SO_4^{2-} + 2H^+ + H_2O_2$$

On the other hand, if the cathode reaction is:

$$O_2 + 4H^+ + 4e^- \longrightarrow 2H_2O \quad E = +1.23$$

then the net reaction will be:

$$4NO + 3O_2 + 2H_2O \longrightarrow 4NO_3^- + 4H^+ \quad E = 0.273 \text{ V vs SHE}$$

$$\text{and/or } 2SO_2 + 2H_2O + O_2 \longrightarrow 2SO_4^{2-} + 4H^+$$

SHE is defined as a standard hydrogen electrode.

Hence, in the latter case, at least theoretically, the process could actually generate energy. In practice, however, this may not be realizable, as it appears that there are no materials at present that can reduce dioxygen at the reversible potential at room temperature.

The external potential can be applied between the anode and the cathode by means of a battery or other suitable device. The realistic range of these potentials in the case of NOX is from zero to 0.5 or 0.6V, depending on the nature of the electrolyte, the pH, and the actual characteristics of the electrodes. A typical external potential is 0.3V.

More particularly, the present invention relates to the removal of nitrogen oxides (NOX) and/or $SO_2$ from flue gas and other sources including engine exhausts, gas turbines and coal-fired power plants. The approach is based on the electrochemical oxidation of NOX and-/or $SO_2$ in an aqueous environment at room temperature using polytetrafluoroethylene-bonded high area carbon gas fed electrodes in a fuel cell-type configuration. This polymeric matrix of the electrode provides structural integrity to the carbon particle conglomerate which makes up the electrode, and at the same time endows the electrode with the necessary degree of hydrophobicity to preclude the unwanted passage of electrolyte to the gas compartment. Although polytetrafluoroethylene is a very common polymer used in this type of application, other materials exhibiting similar physicochemical properties could also be used as hydrophobic binders. That is, highly fluorinated polymers having a similar degree of wettability and physical properties as polytetrafluoroethylene can be used.

As stated, previous efforts have been made to eliminate or reduce the amount of NOX in an exhaust gas. These methods have involved the electrochemical or chemical techniques which focus on reduction of NOX at high temperatures. Overall yields of these processes are often regarded as less than desirable, and the presence of oxygen adversely influences the reaction, leading to a drastic loss of performance.

A number of considerations make the process of the present invention particularly attractive. For instance, the oxidation of NO dissolved in an electrolyte comprised of $H_2O$, with 1 mM perchloric acid ($HClO_4$) and 0.1M sodium perchlorate ($NaClO_4$) at room temperature in atmospheric pressure proceeds at very high rates on ordinary pyrolytic graphite, gold and a variety of other electrode materials. Other electrode materials, such as carbons that have been preadsorbed with organometallic catalysts of the porphyrin or phthalocyanine type can be used. Examples of other electrolytes that can be used include those that involve mineral acids such as sulfuric, nitric, perchloric, and trifluoromethane sulfonic acids; and an inorganic salt to increase ionic conductivity, the inorganic salt selected from among nitrates, sulfates, and perchlorates of alkali or alkaline earth metals.

The reaction is assumed to generate nitrate ($NO_3^-$) as the main and only product, since the oxidation of nitrite ($NO_2^-$), at least on pyrolitic graphite, gold and presumably a host of other electrode materials, appears to ensue with relative ease in about the same potential region, i.e., at the potential region at which NOX undergoes oxidation.

Along these lines, it has been noted that in the present invention, the presence of dioxygen ($O_2$) does not interfere with the overall process, as it does not affect the operation of the anode for concentrations as high as 4%.

As stated above, the type of cell electrodes which can be used in accordance with the present invention include those which are comprised of carbon, gold, and a number of other electrode materials such as platinum and its alloys.

It is important, however, that the electrodes be at least porous, polytetrafluoroethylene-bonded, and gas fed. This will permit a large volume of gas to come into contact with the electrocatalytic interfaces which comprise the microscopic point or points at which the electrolyte, electrode, and gas come into contact. Further, the configuration lends itself to massive scale up as evidenced by the commercialization of large capacity fuel cell stacks.

Turning now to FIGS. 1a and 1b, a schematic diagram of a simple fuel cell-type is shown. Gas-fed electrodes 10 and 20 are shown. They can be fixed in place by a series of Buna-N or other type of gaskets which serve as electrolyte seals. Electrode 10 is the anode and the electrode 20 is the cathode. The fuel gas or the NOX- (as shown in FIG. 1a), and/or $SO_2$— (as shown in FIG. 1b) containing gas is passed through compartment 30. The gas to be reduced, or air (oxygen) in the present situation, is passed through the space or compartment denoted 40. An electrolyte solution 50 is contained in the space between the two electrodes. While not shown, a reference electrode such as a saturated calomel electrode can be inserted into the main compartment, i.e., the compartment which contains the electrolyte. That is, the electrode can be inserted into a Luggin capillary (not shown in the figures) that is within the electrolyte so that the cell can be operated in the three electrode configuration.

The use of a three electrode configuration enables the potential of the NOX/SO$_2$ consuming electrode to be measured with respect to a reference electrode. A knowledge of this value is necessary in order to obtain meaningful relationships between the energetics and kinetics of the interfacial reaction. It is not required, however, for the type of device described herein.

The potential of the anode (or working electrode) can thus be accurately controlled. A potentiostat controls the potential of the anode to within a range of millivolts.

In order to assess the efficiency of the process, a dilute mixture of NOX with an inert gas such as argon or nitrogen is flowed behind the anode, and air is flowed behind the cathode.

According to information available in the literature regarding the rates of dioxygen reduction in this media, application of a large enough potential to the anode with respect to the reference electrode should bring about the oxidation of NO or SO$_2$ at the anode and the reduction of dioxygen at the cathode according to the reactions:

$$NO + 2H_2O \rightarrow NO_3^- + 4H^+ + 3e \text{ and/or}$$
$$SO_2 + 2H_2O \rightarrow SO_4^{2-} + 4H^+ + 2e$$
$$O_2 + 2e^- + H^+ \rightarrow HO_2^-$$

to yield as the net process $$2NO + 4H_2O + 3O_2 + \rightarrow 2NO_3^- + 5H^+ + 3HO_2^-$$
$$\text{and/or } SO_2 + 2H_2O + O_2 \rightarrow SO_4^{2-} + 2H^+ + H_2O_2$$

The electrolyte compartment of the fuel cell is filled with an aqueous electrolyte and the outlet of the anodic gas compartment 30 is connected to a commercial NO infrared detector 60 as shown schematically in FIGS. 1a and 1b. Experiments aimed at determining the Faradaic efficiency can then be conducted in which the working electrode or anode is polarized at a certain fixed potential versus the reference electrode for a given period of time while monitoring the amount of NO in the fuel cell effluent. The data obtained provides the necessary information to calculate the Faradaic efficiency of the process. In order to calculate the Faradaic efficiency for the electrochemical oxidation of NOX, the outlet of the anodic gas compartment was connected to an infrared detector which monitors and records the content of NO in the gas stream after passage through the cell. Based on this information, the Faradaic efficiency as a function of the applied potential can be determined according to the formula:

$$\frac{\text{n° of moles/s consumed according to IR detector}}{\text{n° of moles/s consumed according to electrochemical measurements}} =$$

$$\frac{\text{flow}(cc/min)(min/60s)\Delta ppm(1/10^3 \, cc)(mol/22.41)}{i(mCb/s)/(n \cdot F(Cb/mol \cdot eq)(10^3 \, mCb/Cb)}$$

where n represents the number of electrons transferred. That is, n=3 for the oxidation of NO to NO$_3^-$. The term "flow" represents the flow rate of an effluent gas mixed with an inert gas; "l" represents liters; "i" represents current; "F" represents the Faradaic constant; Cb represents the number of Coulombs; mCb represents millicoulombs, and Δppm represents the difference in the amount of NOX present in the effluent gas before and after applying the potential.

The invention will be more fully described in the following example.

EXAMPLE I

A series of experiments involving a device such as that shown schematically if FIGS. 1a and 1b were conducted using a 1 mM HClO$_4$ and 0.1M NaClO$_4$ aqueous electrolyte at room temperature and high area carbon polytetrafluoroethylene bonded electrodes obtained from Giner Inc., Waltham, Mass. Prior to connecting the cell to the infrared detector, a cyclic voltammogram was recorded at 50 mV/sec to establish the onset for NO oxidation. As indicated in FIG. 2, the value obtained in the presence of essentially pure NO was of about 0.6V vs SCE (see curve B).

Curve A was obtained upon reducing the NO concentration in the cell by flowing pure nitrogen behind the anode. The small current at potentials higher than 0.8V in curve A, FIG. 2, is due to residual NO dissolved in the electrolyte. Negligible currents were found to flow at potentials up to 1.1V vs. SCE in the strict absence of NO in the cell.

Figure 3:
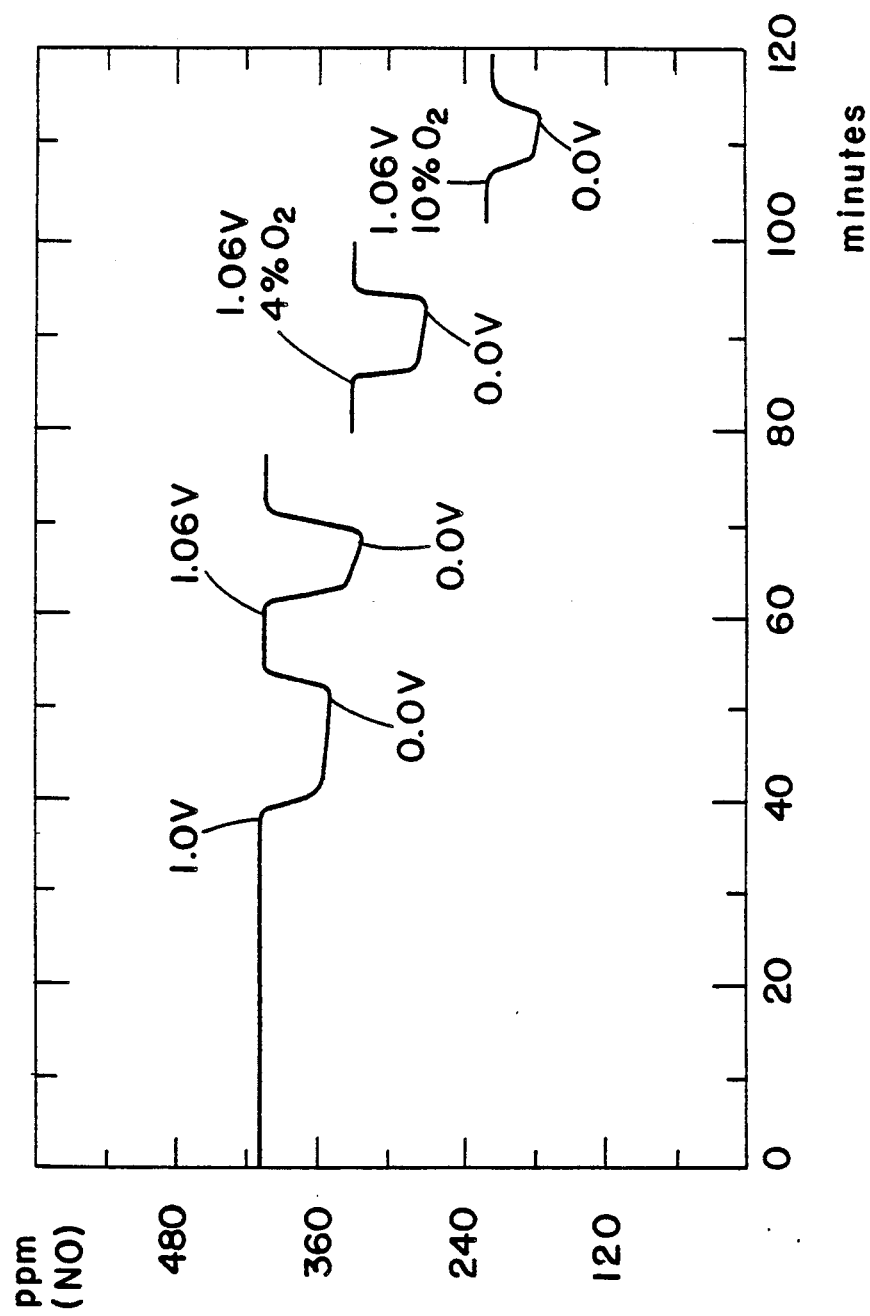
FIG. 3 is a plot of the amount of NO measured with an infrared detector for different gas compositions as a function of time.

FIG. 3 shows the amount of NO as measured by the infrared detector as a function of time for various externally applied potentials. The lag-time between the applied potential and the response of the detector is due to the rather long path the gas is required to travel before reaching the actual sensing element. Results obtained for the system in actual operation are given in TABLE 1. As indicated, Faradaic efficiencies close to 80% can be achieved, with dioxygen not affecting the overall performance up to a concentration of 4%.

TABLE I

| Time (min) | Gas Composition Flowed Behind the Anode | Flow Rate (cc/min) | Applied Potential (V vs SCE) | Current (mA) | (NO) Δ(ppm) | Paradaic Efficiency % |
|---|---|---|---|---|---|---|
| 0–38 | NO (415 ppm) in N$_2$ | 42 | cell off | 0 | — | — |
| 38–50 | | | 1.06 | 726 | 61 | 75.6 |
| 50–59 | | | 0.00 | 0 | — | — |
| 59–69 | | | 1.06 | 955 | 87 | 79.6 |
| 69–77 | | | 0.00 | — | — | — |
| 78–83 | NO (415 ppm) in N$_2$ AIR* | 42 | 0.00 | — | — | — |
| 84–94 | | | 1.06 | 922 | 63 | 76.1 |
| 95–98 | NO (415 ppm) in N$_2$ AIR** | 27 26 | 0.00 | — | — | — |

TABLE I-continued

| Time (min) | Gas Composition Flowed Behind the Anode | Flow Rate (cc/min) | Applied Potential (V vs SCE) | Current (mA) | (NO) Δ(ppm) | Paradaic Efficiency % |
|---|---|---|---|---|---|---|
| 99–107 | | | 1.06 | 746 | 46 | 66 |

*O$_2$. ca. 2%
**O$_2$. ca. 10%
Electrolyte: 0.1M NaClO$_4$ in 0.001M HClO$_4$
Room Temperature
Cross Sectional of Electrode Exposed to Electrolyte; 3.06 cm$^2$
Volume of Gas Chamber Behind Gas-fed Electrodes: 1.5 cm$^3$
Gas Through Cathode Chamber: Air The invention has been described with reference to the preferred embodiment. Obviously modifications and alterations will occur to others upon a reading and understanding of this specification. It is intended to include all such modifications and alterations insofar as they come within the scope of the appended claims or the equivalents thereof.

I claim:

1. A method for removing nitrogen oxide from a gas, comprising the steps of:
   providing an electrochemical cell;
   bringing a gas comprising nitrogen oxide into contact with a gas-permeable anode contained in the cell;
   bringing a gas comprising oxygen into contact with a gas permeable cathode contained in the cell, the cathode separated from the anode by a liquid electrolyte;
   oxidizing the nitrogen oxide at the anode to yield nitric acid; and
   reducing the oxygen at the cathode.

2. A method for removing nitrogen oxide from a gas, as set forth in claim 1, wherein the anode is a gas-fed, high-area carbon electrode.

3. A method for removing nitrogen oxide from a gas, as set forth in claim 1, wherein the cathode is a gas-fed, high-area carbon electrode.

4. A method for removing nitrogen oxide from a gas, as set forth in claim 1, wherein the electrolyte is comprised of H$_2$O.

5. A method for removing nitrogen oxide from a gas, as set forth in claim 4, wherein the electrolyte includes an acid therein.

6. A method for removing nitrogen oxide from a gas, as set forth in claim 4, wherein the electrolyte includes a salt therein.

7. A method for removing nitrogen oxide from a gas, as set forth in claim 1, comprising the additional step of:
   applying an external potential to the cell to bring about the oxidizing and reducing steps, wherein the external potential applied to the cell is supplied by a voltage generating device.

8. A method for producing nitric acid, comprising the steps of:
   providing an electrochemical cell;
   contacting a gas comprising nitrogen oxide with a gas-permeable anode contained in the cell;
   contacting a gas comprising oxygen with a gas permeable cathode contained in the cell, the cathode separated from the anode by an aqueous electrolyte;
   oxidizing the nitrogen oxide at the anode to yield nitric acid; and
   reducing the oxygen at the cathode.

9. A method for producing nitric acid, as set forth in claim 8, comprising the additional step of draining the electrolyte to collect the nitric acid.

10. A method for producing nitric acid, as set forth in claim 8, wherein the anode is a gas-fed, high-area carbon electrode.

11. A method for producing nitric acid, as set forth in claim 8, wherein the cathode is a gas-fed, high-area carbon electrode.

12. A method for producing nitric acid, as set forth in claim 8, wherein the electrolyte is comprised of H$_2$O.

13. A method for producing nitric acid, as set forth in claim 12, wherein the electrolyte includes an acid therein.

14. A method for producing nitric acid, as set forth in claim 12, wherein the electrolyte includes a salt therein.

15. A method for producing nitric acid, as set forth in claim 8, comprising the additional step of:
   applying an external potential to the cell to bring about the oxidizing and reducing steps, wherein the external potential applied to the cell is supplied by a voltage generating device.

16. A method for removing sulfur dioxide from a gas, comprising the steps of:
   providing an electrochemical cell;
   contacting a gas comprising sulfur dioxide with a gas-permeable anode contained in the cell;
   contacting a gas comprising oxygen with a gas permeable cathode contained in the cell, the cathode separated from the anode by a liquid electrolyte;
   oxidizing the sulfur dioxide at the anode to yield sulfuric acid; and
   reducing the oxygen at the cathode.

17. A method for removing sulfur dioxide from a gas, as set forth in claim 16, wherein the anode and cathode are comprised of gas-fed electrodes.

18. A method for removing sulfur dioxide from a gas, as set forth in claim 16, wherein the electrolyte is an aqueous solution comprising an acid and a salt.

19. A method for removing sulfur dioxide from a gas, as set forth in claim 16, comprising the additional step of draining the electrolyte to collect the sulfuric acid.

20. A method for removing sulfur dioxide and nitrogen oxide from a gas, comprising the steps of:
   providing a cell comprising an anode and a cathode;
   contacting a gas comprising sulfur dioxide and nitrogen oxide with the anode;
   contacting a gas comprising oxygen with the cathode, the cathode separated from the anode by an aqueous electrolyte;
   oxidizing the sulfur dioxide at the anode to yield sulfuric acid;
   oxidizing the nitrogen oxide at the anode to yield nitric acid;
   reducing the oxygen at the cathode.

21. A method for removing sulfur dioxide and nitrogen oxide from a gas, as set forth in claim 20, comprising the additional step of:

applying an external potential to the cell to bring about the oxidizing and reducing steps, wherein the external potential applied to the cell is supplied by a voltage generating device.

22. A method for removing sulfur dioxide and nitrogen oxide from a gas, as set forth in claim 20, comprising the additional step of draining the electrolyte to collect the sulfuric acid and nitric acid therefrom.

* * * * *